Sept. 13, 1966      H. B. BROSE      3,272,253
TIRE REPAIR INSERT
Filed Feb. 10, 1965
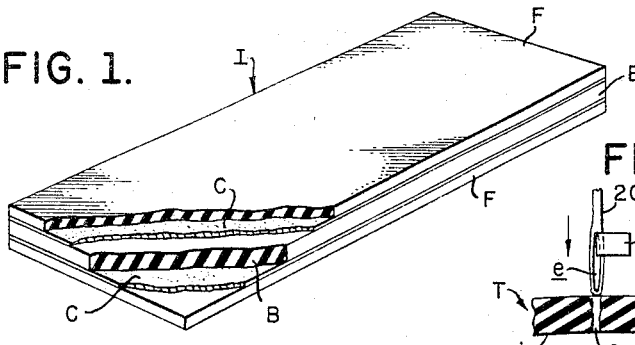
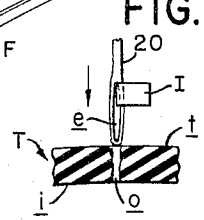
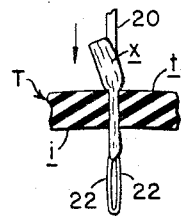
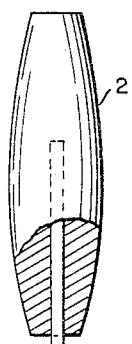
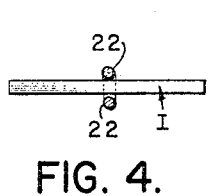
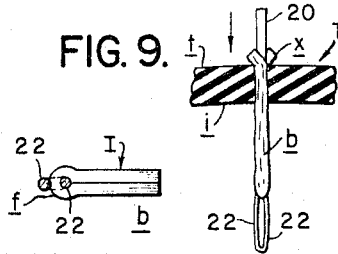
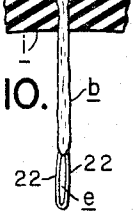
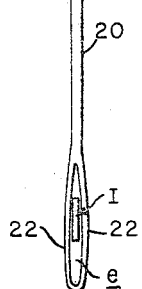
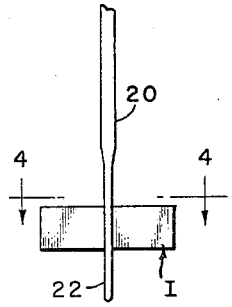
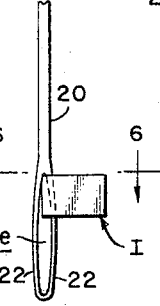
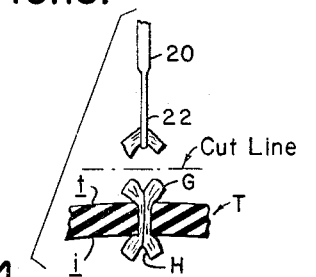
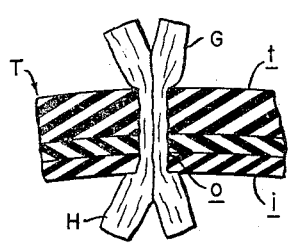
INVENTOR
HORACE B. BROSE
BY Ephraim Brumm III
ATTORNEY

United States Patent Office 3,272,253
Patented Sept. 13, 1966

3,272,253
TIRE REPAIR INSERT
Horace B. Brose, 5013 N. Westshore Blvd., Tampa 3, Fla.
Filed Feb. 10, 1965, Ser. No. 431,623
4 Claims. (Cl. 152—370)

This invention relates to a sealing insert applicable to a puncture opening in a vehicle tire, particularly of the inflatable tubeless type. More especially it is concerned with the sealing of such an opening by the use of a highly elastic, multi-ply composite insert of wafer or strip form, and with the method employed to effect its placement dependably in optimum position within the opening to be sealed.

A tire repair insert, to be effective, should combine the desirable properties of elasticity, pliability, tensile strength, and conformability to various tire injury openings differing widely in size and shape. At the same time it involves problems in the union of its components, if of multi-ply structure, in dependably applying the insert in optimum sealing position within a tire injury opening, and in sealing the insert fixedly to the tire walls surrounding the injury opening. These problems, also others which will be hereinafter noted, have been overcome by the improved insert of this invention.

Among other objects and advantages realized by the present insert are (a) increased tensile strength, (b) increased pliability and conformability to provide an effective seal for the injury opening wherein the insert is installed, (c) increased shelf-life for the sealing insert whereby it remains effective and unimpaired for an indefinite period of time prior to its application to a tire injury opening, and (d) reduction in cost of the components forming the laminated structure of the repair insert. These components are a minimum of three in number, viz.: (1) an elastic wafer-like base lamination of cured rubber or the like having a high tensile strength, (2) a spread of elastic adhesive cement applied to opposite faces of the base lamination, and (3) a pliable facing of uncured, non-vulcanizable rubber or rubber-like material affixed to each face of the base lamination and united firmly thereto by the adhesive spread thereupon. In such a structure, the volumetric ratio of the pliable facings to the insert as a whole desirably exceeds 50% to provide sealing material in a maximum amount to assure effective sealing of the tire injury opening wherein it is to be placed. The problem of achieving such a relationship without expanding the insert to a size too large for its intended use is also solved satisfactorily, as hereinafter noted.

An improved method of applying the insert to the injury opening within a tire is also a feature of the present invention. This involves the use of an elongated needle having in its probing end portion an eye through which the elongated wafer-like insert is preliminarily fitted for securement thereto in a special manner. Such a needle is first advanced into the injury opening to carry with it the insert to a point beyond the inner face of the tire where the insert is free to expand outwardly and reposition itself within the needle eye; the needle is then retracted outwardly for a limited distance to carry with it the insert in an elongated state to a final sealing position where opposite ends of the insert, protruding beyond the proximate tire faces, are free to expand into heads. A critical stage of this operation is reached when the insert, during its forward advance, is stretched and attenuated to a maximum point. Its trailing end is then suddenly released to permit its body to snap into a collapsed condition whereby to transmit to its advancing end portion a powerful propelling force which tends to dislodge the insert from the needle eye. If and when this happens, the insert is irrecoverably lost within the tire. Another insert, also a repeat operation of installation therefor, is then necessary; if in the ensuing critical stage, the insert does not disengage itself from the needle, the sealing operation will probably be successful, otherwise not. This ever-present problem of insert separation from the needle accounts for many failures in tire repairing, particularly in the hands of careless operators. By the means and method of this invention, as hereinafter disclosed, it is entirely overcome.

A suggestive embodiment of this invention in a preferred form, as well as the steps involved in its installation, is illustrated in the accompanying drawing in the manner following:

FIGURE 1 is a perspective view, partly in section, of the present tire repair insert in its initial form of an elongated wafer;

FIG. 2 is a view in elevation of a needle suitable for advancing the insert into a tire injury opening, this view also depicting an end elevation of an insert as when preliminarily fitted within the needle eye in its probing end portion;

FIG. 3 is a fragmentary elevational view of the probing end portion of the needle, looking from a different angle to show one broad face of the insert when first fitted therein;

FIG. 4 is a view in section, taken on line 4—4 of FIG. 3;

FIG. 5, which is a view similar to FIG. 3, shows one broad face of the insert when doubled upon itself and wrapped around one bight of the needle eye;

FIGS. 6–14 are views similar to FIGS. 3 and 5, showing more or less diagrammatically the position of the needle and insert fitted therein during various stages of (a) their forward advancing movement into and through the injury opening of a tire, and (b) their limited retractive movement to a final position where the insert is in optimum sealing position, its leading end portion being then protruded outwardly beyond the tread face of the tire where it may be readily severed to free the needle therefrom; and FIG. 15 is an enlarged fragmentary sectional view through a tire having therein an injury opening occupied by the present repair insert following its installation in an optimum sealing position.

The term "tire," as used herein, has reference to the usual casing of an inflatable tire for which the present sealing insert is especially adapted. With a tire having an inner tube, this term would designate the outer casing therefor, and it should be so understood herein. The widest field of use for the insert of this invention is that now dominated by the so-called tubeless tires, hence the description will be confined thereto in the detailed disclosure to follow.

The present multi-ply tire sealing insert I, herein illustrated, desirably consists essentially of an elongated wafer-like base lamination B of rubber or rubber-like material arranged between a pair of facing laminations F. A continuous spread of adhesive cement C which intervenes between the base and each facing serves to unite these three components inseparably and permanently together. In a multi-ply insert of the kind under description, the base lamination serves importantly as a vehicle for its two facings which are relied upon to establish sealing engagement with the tire walls surrounding an injury opening within its body. A high tensile strength is required for such a vehicle due to the frictional resistance encountered when the insert is being forced into operative position within a tire T. For this purpose it is preferred to use for the base lamination a rubber compound which is cured or vulcanized whereby to greatly increase its cohesive and elastic properties.

The facings are desirably produced from gum rubber, or rubber which is uncured, and free of sulfur and/or accelerator so as to be non-vulcanizable. The life of such a rubber is almost indefinite, as is also its pliability and conformability. Its stretchability is also greater by far than is that of the base lamination. These are important attributes enabling the facings to adapt themselves for continuous pressure contact with every uneven and irregular portion of the exposed tire walls within an injury opening $o$ when the present insert is installed therein as hereinafter described.

The unitary character of the present multi-ply insert is assured by the use of suitable spreads of adhesive cement C. Desirably the cement chosen should be rubber based, minus any sulfur or accelerator, to provide spreads having elastic capabilities comparable with that of the base lamination at least. The union thereby produced between the base and facings which is mechanical only, will withstand rupturing in use. Its deterioration rate is also so negligible as to be safely ignored.

In any commercial production of the present inserts, united assembly of its components is desirably performed while each of the laminations is in the form of a sheet of considerable size. To protect the sheets so assembled, covers of holland cloth or the like should be removably applied over the exposed outer tacky surfaces of the facing laminations, to be stripped therefrom at the time of insert use. The several laminations, after assembly, are cut up into strips or elongated wafers of a size convenient for tire repair use. One size, suitable for application to many common injury openings, is approximately ⅝" wide by 1¾" to 2" long, with an overall thickness of .049" to .092". A suggestive thickness for the base lamination is .028" and for each facing lamination a minimum of .018". The ratio of base lamination thickness to that of its two facings is desirably less than one to one, or a proportion of about 7 to 9. It is desirable also that the volumetric ratio of the uncured rubber facings should exceed that of the cured rubber base lamination for two reasons: (1) a substantial price differential favors the use of rubber which is not cured, and (2) curing of the base lamination is more complete and uniform if its thickness be minimized. As a further advantage, the tensile strength imparted to a thin base lamination will be greater, thereby conditioning it to serve more effectively as a vehicle for the facings when carried, in a highly compressed state, into a tire injury opening for repair thereof.

An insert I, when stripped of its protecting covers to expose the tacky outside faces of its laminations F, is adapted to be forced into the tire injury opening $o$ of a tire T with the aid of a suitable applicator, as best shown in FIG. 2. This is essentially a needle having an elongated shank 20 equipped at one end with a handle 21, its probing end portion being split to provide a pair of oppositely bowed bights 22 defining between them a seat in the form of an elongated eye $e$. An insert may be readily fitted into the eye when advanced endwise into its intermediate wide portion (FIGS. 2 and 3); when advanced through a distance of approximately one-half its length, the insert can be slid upwardly within the eye to be held fixedly in a seat between the converging bights 22 (FIG. 5). The insert is then wrapped around one of the bights to be doubled upon itself about an arcuate line of fold $f$ (FIGS. 5 and 6). Opposite end portions of the insert are then pressed against each other to form a body $b$, the interengagement of their contacting tacky faces being continuous and complete except for the limited fold portion $f$ which is wrapped around the bight. When so positioned, the insert is extended outwardly and away from the bight in any chosen direction with its thickness and laminations then being doubled, the laminations then being six in number according to the construction illustrated.

The tire injury opening $o$ to be repaired is preliminarily cleaned out and smoothed off with a buffing tool of any suitable kind. A relatively quick-setting adhesive cement, then in a liquid state, is next applied to the tire body surfaces within the injury opening. This cement, which may be the came as that employed for uniting the insert laminations, is desirably devoid of any vulcanizing agent. Its purpose is (a) to initially lubricate the opening to facilitate placing of the insert therewithin, and (b) to provide thereafter a mechanical bond between the walls surrounding the injury opening and the insert therein introduced so that the latter will remain fixedly secured therewithin.

With the insert properly fitted to the needle and the injury opening properly conditioned for its reception, the probing end of the needle is then dipped into the adhesive cement already described. This conditions the insert for adherence to and sealing within a tire injury opening once the cement has set. The operator is now ready to advance the needle axially through a forward stroke, probing end first, into and through the opening $o$. FIGS. 7–10 depict four stages in this forward stroke. The probing end of the needle is first positioned at the tread face $t$ of the tire opposite the injury opening, ready to be advanced axially therein, as shown in FIG. 7. An initial advance of the needle carries the insert part way through the opening, as represented in FIG. 8, the tractive force exerted against the insert on this stroke being applied thereto approximately at the lineal fold point $f$ where it is wrapped around the needle bight. This point then becomes the leading end or edge of the insert whose body $b$ of six united laminations (in the structure illustrated) trails along and/or around the needle shank. During this forward stroke, the insert body portions remaining exteriorly of the tire tread face expand laterally into the form of a temporary head $x$ which offers a very substantial but diminishing resistance to reduction in cross-sectional size of the insert as required for its entrance into the injury opening (FIGS. 8 and 9). The insert is forced to yield, however, in response to continuing forward movement of the needle. As a result, the insert becomes stretched and attenuated from its leading end $f$ clear back through that portion of its trailing body $b$ which is confined within the injury opening.

The resistance offered by the insert head $x$ at the tire tread face $t$ gradually wanes with a diminution in the size of the head as more and more of the insert body is drawn into the injury opening and therebeyond into the open space beyond the tire inner face $i$. Concurrently, stretching of the insert also increases to a maximum point of several times its normal length. This point is reached when the head size is so reduced that its diminishing resistance closely approaches zero (FIG. 9). This is a crucial moment of the installation operation because, with cessation of resistance and with stretching of the insert to its maximum, a very sudden and swift collapse thereof takes place. This involves a snapping contraction of the insert endwise, accompanied by disappearance of its head $x$ and a swift self-propulsion of the entire insert body forwardly and inwardly clear through the injury opening and therebeyond (FIG. 11). The violent reactive shock force thereupon created tends to dislodge the insert from the needle. If and when this happens, the insert drops off to become irretrievably lost within the interior of the tire. It is to prevent any such dislodgment that the insert of this invention is wrapped around one of the bights 22 of the needle eye (1) to double the thickness and number of its laminations throughout the entire free portion of the insert body, (2) to unite the two insert body portions so doubled upon themselves throughout 100% of the area of their contacting faces, and (3) to lock the insert securely to the needle bight so as to obviate any separation therefrom at the moment of shock just referred to.

Forward stroking advance of the needle ends when the insert has been drawn completely through the injury opening $o$ and into the open space inwardly thereof. Installation requires, however, a reverse stroking retraction of the needle and insert from the initial position of FIG. 11 to a second position (FIG. 12) where the insert body in a relaxed state lies adjacent the tire inner face $i$. When drawn back still further into and through the injury opening from its inner end, the insert body portions inwardly of the tire offer a diminishing resistance to this movement as well. Continued retraction of the needle causes the position of the insert body to be reversed so that a new expanded head H is formed adjacent the tire inner face $i$ to limit outward movement of the insert toward the tire tread face $t$. This retractive movement of the needle proceeds through to the stage of FIG. 13 where the leading edge $f$ of the insert is positioned a short distance beyond the tread face $t$ of the tire—a stroking movement which is somewhat less in distance than that involved in its forward stroke. At this point, a knife or other implement is applied to sever the insert body near its fold line $f$ adjacent the probing end of the needle (FIG. 14). The insert body end portions then protruding outwardly beyond the tire tread face are now freed for lateral expansion into a head G which engages the tire tread to cooperate with the head H at the tire inner face $i$ to hold the insert fixedly in place against endwise movement. With setting of the cement, the head G may be clipped off, or be allowed to wear off during the first few miles of road travel of the vehicle. The insert in its installed state consists of two elongated units, substantially alike, which throughout the major portion of their length are adhered inseparably together and to the opening wherein they are sealed under compression. With severance of the original unit at its outer end, as just described, the needle is freed for separation for further use elsewhere. This operation of installing the insert with its opposite pairs of body end portions laterally expanded into locking heads is then completed, all within the space of a second or two when performed by an experienced operator. When the adhesive cement has set to secure and seal the insert in place (requiring only a few moments of time) re-inflation of the tire may be safely performed to condition the vehicle for resumed operation upon the road.

In the process of drawing a wafer-like insert into and/or through an injury opening, usually very constricted and often irregular, the form and shape of the insert body is changed unpredictably. Since the tractive force for drawing the insert through each stroke is applied thereto at its leading edge, other portions of the insert body are caused to trail therebehind. These trailing portions of the body lie haphazardly alongside the needle shank, probably on all sides thereof, particularly if the needle be oscillated or turned during its axial movements, as is common. Due to the constricted character of most injury openings, the needle and insert carried thereby must force their way into and through the opening, and in so doing the resilient tire walls surrounding the opening are concurrently pressed back somewhat to create a counterforce directed laterally against the insert body, tending to produce a compression and attenuation thereof while undergoing elongation in response to the tractive force applied to its leading edge. At the conclusion of the reverse stroking movement (FIG. 13), the needle will have removed itself from the injury opening, thereby vacating a space which is concurrently occupied by the insert body then under compression. The insert immediately expands laterally into tight engagement with the walls surrounding the injury opening. The insert facings of soft pliable uncured rubber material are then pressed into the irregularities, crevices and corners of the injury opening to conform thereto and remain in intimate contact therewith at every point. This self-adaptation of the flexible insert facings to optimum sealing position within the opening is facilitated by the lubricating properties of the still-fluid adhesive cement film previously applied to the insert and to the walls surrounding the injury opening.

In the present insert it is to be noted the base lamination is very thin in relation to its length and width, the dimensions herein suggested offering substantial advantages. This is attributable to (1) the area of its opposite faces (as distinguished from its edges) approaching the maximum as the thickness of the lamination body approaches a minimum, thereby creating (2) an optimum condition for its effective curing since the lamination body so reduced in thickness is thereby more readily receptive for penetration of the heat applied for this purpose. In consequence, the base lamination may thereby be endowed with the properties of strength and elasticity in an enhanced degree, rendering possible also the association therewith of soft pliable facings of uncured rubber or the like of an increased thickness without any corresponding increase in the overall thickness of the laminated insert. The objective of a composite insert having a base, with attached outer facings of soft pliable material whose depth or thickness is substantially increased, is thereby attained, with a resulting increase also attained in the effectiveness of the seal which it provides for a tire injury opening.

The factors involved in each insert installation are so variable as to preclude any real uniformity in the resulting size, shape and appearance of the insert when installed. There is, however, one constant factor in most cases, that being the original size of the insert itself. The length of the injury opening $o$ into which the inserts are to be fitted may vary, depending upon the wall thickness of the tire itself at that point. Also, the cross-sectional area of the openings may vary widely, whereby to impose an uncertain frictional resistance to advance of the insert therethrough. For these reasons alone, any applicator used to advance the insert into and through an injury opening, both ways, with the operator responsible for determining the extent of its retractive movement, cannot assure a uniform amount of stretching of the insert nor an exact uniform outward expansion of its body against the tire walls surrounding the injury opening. Variations such as these are relatively inconsequential, however, insofar as concerns the capacity of the insert to provide an effective seal for a tire injury opening.

It is impossible to depict with exactness the size, shape, rugae or contour of the head formed at either end of the installed insert because both are wholly amorphous in character. No two of them are entirely alike. This may be due, in part at least, to the great disparities in the forces created during the installation operation which are responsible for concurrent compression, stretching, attenuation, and expansion in various portions of the same insert. Variations in the sizes and shapes of the injury openings, as well as the resistance offered by the surrounding walls thereof, control to a considerable extent the conformed size and shape of the installed inserts. Also the degree of tensity in the several forces created within these inserts at the time of their installation is a factor precluding any uniformity in their size, shape and appearance. The showings of the insert bodies and heads throughout the drawing suffice to indicate roughly their general conformation, but should not be taken as exact representations thereof.

During the major portion of its advance through an injury opening $o$ and out into open space therebeyond, the insert I, because of its elasticity, is amenable to stretching of its body $b$ and related attenuation thereof while elongated within the injury opening. A powerful reactive counter pressure is then exerted outwardly against the tire walls surrounding the opening, causing the insert body to expand laterally with increased force into every crack and crevice in the injury opening that is exposed for its reception. This counter pressure is also reflected in the degree of expansion of the unconfined portions of the insert body which lie exteriorly of the opening to form the heads H and G at opposite ends thereof. In practice, these heads which are somewhat irregular in contour are probably wider by several times than is the intermediate body of the insert which remains compressed within the injury opening to exert a continuing strong outward pressure against the surrounding walls thereof. Even though some minor diminution in this pressure will follow withdrawal of the needle from the repaired injury opening, an effective sealing thereof which starts very soon thereafter will have been completed after a very short period of time.

When installed within an injury opening, the present insert is folded upon itself whereby to double the number of its original laminations which are all united into a unitary structure. This gain in cross-sectional dimension is matched by an increased capacity for attenuation, when stretched. During installation, the walls surrounding an injury opening must be forced apart somewhat, but not nearly so much as would be required with an insert of corresponding size if devoid of multiple laminations as herein disclosed. If follows that only a minor strain is imposed upon the body of a tire when its injury opening is enlarged the slight amount necessary for accommodation of the present insert and the applicator therefor, and during this operation any splitting of the tire walls or damage to the nearby cords therein can be obviated or held to a minimum. Because of its unique properties and structure, my improved insert is also adaptable for effective use in many tire injury openings varying widely in size and shape, thereby permitting its use in many diverse situations with only a minimum number of different sizes and shapes of inserts necessary for such purposes. In fact, in cases of unusually large puncture openings to be repaired, it is possible to provide an effective seal by installing therein more than one insert, either concurrently or sequentially.

I claim:

1. For repairing an injury opening in a tubeless tire, an elastic insert in the form of an elongated thin multi-ply wafer adapted to be forced in a folded, stretched and attenuated state into and, in part, through the tire injury opening to occupy fully the space therewithin and provide an effective seal therefor, comprising a base lamination of a cured rubber composition having a high tensile strength and a facing lamination of non-vulcanizable uncured soft and pliable rubber composition applied to each of the opposite faces of the base lamination, a spread of adhesive material devoid of any vulcanizing agent therein interposed between each facing lamination and the base lamination whereby intimate contact therebetween may continue indefinitely without inducing any vulcanizing of the facings, the adhesive material acting to mechanically join the several laminations into a unitary structure having an ample volume for an effective seal against leakage of air through the injury opening when the insert is forcibly fitted therewithin for adherence to the surrounding walls thereof.

2. In a vehicle tire having an injury opening extending therethrough, means for sealing the opening in the form of an elastic multi-ply insert comprising a base lamination forming a vehicle of high tensile strength arronged between two pliable, soft and tacky facings, the base lamination being of cured rubber or the like and the facings being of non-vulcanizable uncured rubber having a combined thickness no less than that of the base lamination, a rubber-based adhesive cement spread devoid of any vulcanizing agent therein uniting each facing to the base lamination whereby intimate contact therebetween may continue indefinitely without inducing any vulcanizing of the facings, the base lamination being highly elastic, the cement spread and the facings being stretchable to an extent no less than the base lamination, the cement spread having a high adhesive value whereby to firmly unite the facings mechanically to the base lamination in all stretched conditions of the latter, and a further spread of similar adhesive cement applied to all exterior surfaces of the insert and to the walls surrounding the injury opening whereby to secure the one inseparably within the other and fill all voids therebetween to establish an effective seal therefor.

3. The method of repairing an injury opening in the body of a tubeless tire comprising the steps of (1) providing an elongated elastic rubbery tire repair insert having opposite flat tacky faces, (2) providing an elongated tool shank formed with a seat, adapted for reception within the injury opening, (3) engaging the insert fixedly with the tool shank seat, (4) folding the insert transversely upon itself at a point medially of its length to surround a portion of the tool shank and double the thickness of the insert body wherein its flat tacky faces are interengaged flat-wise for continuous adherence to each other and to the tool shank, thereby to lock the insert to the tool shank in a fixed position thereupon, (5) moving the tool shank axially inwardly from the tread face of the tire toward its opposite face to advance the insert, folded edge first and with its doubled body portions trailing therebehind, into the injury opening to be compressively engaged therein, (6) continuing to move the tool shank axially inwardly until the insert is advanced clear through the injury opening for expansion into a relaxed state within the open space therebeyond, (7) then retracting the shank of the tool axially outwardly through the injury opening, in a direction opposite to that in which it was previously advanced, to carry with it the insert, folded edge first and with its body portions of double thickness trailing therebehind, (8) continuing to retract the tool shank axially outwardly until the folded leading edge portion of the insert has emerged, at the tread face of the tire, from the injury opening free of confinement therewithin and for expansion exteriorly thereof, the rear end of the trailing portions of the insert still remaining within the space interiorly of the tire being free for expansion into a head engageable with its inner face, and (9) severing the insert at its folded leading edge to free the tool shank for separation from the insert, thereby to leave the insert with its body portions of double thickness extended lengthwise of the injury opening in a compressed state therewithin, and therebeyond, exteriorly of the tire tread face, the end portions of the insert adjacent its severed end being free for expansion into a head engaging the tread face of the tire and cooperating with the insert head engaging the tire inner face to resist endwise movements of the insert within the injury opening.

4. The method of repairing an injury opening in the body of a tubeless tire comprising the steps of (1) providing an elongated thin elastic rubbery insert having opposite flat tacky faces, (2) providing an elongated tool shank formed with a seat, adapted for reception within the injury opening, (3) folding the insert transversely of itself and around a portion of the tool shank to engage the seat thereby to double the thickness of the insert body with its flat tacky faces interengaged for continuous adherence to each other and to the tool shank to secure the insert to the tool seat, (4) moving the tool shank axially inwardly from the tread face of the tire toward its opposite face to advance the insert, folded edge first and with its doubled body portions trailing therebehind, into the injury opening to be compressively engaged therein, (5) continuing to move the tool shank axially inwardly to produce concurrently a stretching of the insert body of double thickness within the injury opening, counter to yielding opposition from the expanded trailing end portions of the insert still remaining exteriorly of the injury opening adjacent the tread face of the tire, until the leading folded edge portion of the insert is advanced clear through the injury opening and into open space therebeyond a distance sufficient to draw into the injury opening the entire trailing end portions of the insert, the insert body of double thickness, then free of all opposition, being suddenly released for contraction in a lengthwise direction thereupon tending reactively to project itself inwardly through the injury opening and therebeyond into the space interiorly of the tire while remaining engaged with the tool shank seat, (6) then retracting the tool shank axially outwardly through the injury opening, in a direction opposite to that in which it was previously advanced, to carry with it the insert, folded edge first and with its body portions of double thickness trailing therebehind to be compressively engaged by the walls surrounding the injury opening, (7) continuing to retract the tool shank axially outwardly until the insert leading folded edge portion has emerged, at the tread face of the tire, from the injury opening free of confinement therewithin and for expansion exteriorly thereof, the rear end of the trailing portions of the insert still remaining within the space interiorly of the tire being free for expansion into a head engageable with its inner face, and (8) severing the insert at its folded leading edge to free the tool shank for separation from the insert, thereby to leave the insert with its body portions of double thickness extending lengthwise of the injury opening in a compressed state therewithin and therebeyond, exteriorly of the tire tread face, the end portions of the insert being free for expansion into a head engaging the tread face of the tire and cooperating with the insert head engaging the tire inner face to resist endwise movements of the insert within the injury opening.

References Cited by the Examiner
UNITED STATES PATENTS

| | | | |
|---|---|---|---|
| 1,268,536 | 6/1918 | Atwood | 152—367 |
| 3,035,626 | 5/1962 | Mullen | 152—370 |
| 3,095,342 | 6/1963 | Kraly | 152—370 X |
| 3,172,446 | 3/1965 | Gruber | 152—370 |
| 3,174,525 | 3/1965 | Brose | 152—370 |

ARTHUR L. LA POINT, *Primary Examiner.*

C. W. HAEFELE, *Assistant Examiner.*